US012655789B2

(12) United States Patent
Smith

(10) Patent No.: US 12,655,789 B2
(45) Date of Patent: Jun. 16, 2026

(54) MULTI-FUEL GAS TURBINE ENGINE WITH WATER INJECTION

(71) Applicant: Pratt & Whitney Canada Corp., Longueuil (CA)

(72) Inventor: Scott Smith, St-Lambert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/238,886

(22) Filed: Aug. 28, 2023

(65) Prior Publication Data

US 2025/0075656 A1 Mar. 6, 2025

(51) Int. Cl.
*F02C 3/30* (2006.01)
*F02C 3/22* (2006.01)

(52) U.S. Cl.
CPC ................. *F02C 3/30* (2013.01); *F02C 3/22* (2013.01); *F05D 2220/323* (2013.01); *F05D 2270/16* (2013.01)

(58) Field of Classification Search
CPC ...... F02C 3/30; F02C 9/40; F23C 1/08; F23C 1/00; F05D 2220/323; F05D 2270/16; F23D 17/002; F23D 2204/00; F23D 2204/10
See application file for complete search history.

(56) References Cited

U.S. PATENT DOCUMENTS 5,146,741 A 9/1992 Sood
6,092,363 A 7/2000 Ryan

| | | |
|---|---|---|
| 7,082,765 B2 | 8/2006 | Fortuna |
| 7,127,899 B2 | 10/2006 | Sprouse |
| 7,716,933 B2 | 5/2010 | Prociw |
| 9,243,804 B2 * | 1/2016 | Zhang ...................... F02C 3/30 |
| 9,267,433 B2 | 2/2016 | Zhang |
| 10,228,137 B2 | 3/2019 | Kopp-Vaughan |
| 10,337,412 B2 | 7/2019 | Selfridge |
| 2009/0007568 A1 * | 1/2009 | Eccles ..................... F02C 7/268 |
| | | 60/787 |
| 2010/0293959 A1 * | 11/2010 | Remy ....................... F23R 3/36 |
| | | 60/776 |
| 2011/0289932 A1 * | 12/2011 | Thompson ............... F02C 3/30 |
| | | 60/776 |
| 2014/0360202 A1 * | 12/2014 | Toon ....................... F23R 3/343 |
| | | 60/776 |

(Continued)

OTHER PUBLICATIONS

EP Search Report for EP Patent Application No. 24197072.2 dated Jan. 24, 2025.

*Primary Examiner* — Phutthiwat Wongwian
*Assistant Examiner* — Roberto Toshiharu Igue
(74) *Attorney, Agent, or Firm* — Getz Balich LLC

(57) ABSTRACT

A method of operation is provided during which a gaseous fuel is directed through a gas manifold to a plurality of fuel injectors during a first mode of operation. The gaseous fuel may be or otherwise include hydrogen gas. A gas turbine engine includes the gas manifold, a liquid manifold and the fuel injectors. A first liquid fluid is directed through the liquid manifold to the fuel injectors during the first mode of operation. The first liquid fluid may be or otherwise include water. A second liquid fluid is directed through the liquid manifold to the fuel injectors during a second mode of operation. The second liquid fluid may be or otherwise include liquid fuel.

17 Claims, 7 Drawing Sheets

(56) References Cited

U.S. PATENT DOCUMENTS

| | | | | |
|---|---|---|---|---|
| 2016/0146117 A1* | 5/2016 | Swann | ...................... | F02C 9/46 |
| | | | | 60/39.19 |
| 2016/0209037 A1* | 7/2016 | Dai | ........................... | F23R 3/12 |
| 2016/0341429 A1 | 11/2016 | Selfridge | | |
| 2021/0277839 A1* | 9/2021 | Madden | ................... | F02C 9/28 |
| 2022/0325668 A1 | 10/2022 | Wong | | |
| 2022/0356845 A1* | 11/2022 | Morenko | ............. | F23D 11/107 |
| 2023/0194097 A1 | 6/2023 | Hart | | |
| 2023/0258106 A1 | 8/2023 | Terwilliger | | |
| 2024/0418127 A1 | 12/2024 | Snyder | | |

* cited by examiner

MULTI-FUEL GAS TURBINE ENGINE WITH WATER INJECTION

TECHNICAL FIELD

This disclosure relates generally to a gas turbine engine and, more particularly, to a delivering multiple fluids to a combustor of the gas turbine engine.

BACKGROUND INFORMATION

There is interest in alternative fuels for gas turbine engines. There is interest, for example, in fueling a gas turbine engine with hydrogen rather than a traditional hydrocarbon fuel such as kerosine to reduce greenhouse emissions. There is also interest in fueling a gas turbine engine with multiple fuels. Various systems and methods are known in the art for fueling a gas turbine engine with multiple fuels. While these known systems and methods have various advantages, there is still room in the art for improvement.

SUMMARY

According to an aspect of the present disclosure, a method of operation is provided during which a gaseous fuel is directed through a gas manifold to a plurality of fuel injectors during a first mode of operation. The gaseous fuel may be or otherwise include hydrogen gas. A gas turbine engine includes the gas manifold, a liquid manifold and the fuel injectors. A first liquid fluid is directed through the liquid manifold to the fuel injectors during the first mode of operation. The first liquid fluid may be or otherwise include water. A second liquid fluid is directed through the liquid manifold to the fuel injectors during a second mode of operation. The second liquid fluid may be or otherwise include liquid fuel.

According to another aspect of the present disclosure, another method of operation is provided during which a gaseous fuel is directed through a gas manifold to a plurality of fuel injectors during a first mode of operation. A gas turbine engine includes the gas manifold, a liquid manifold and the fuel injectors. Water vapor is extracted from combustion products generated by the gas turbine engine to provide water. A first liquid fluid is directed through the liquid manifold to the fuel injectors during the first mode of operation. The first liquid fluid may be or otherwise include at least some of the water. A second liquid fluid is directed through the liquid manifold to the fuel injectors during a second mode of operation. The second liquid fluid may be or otherwise include liquid fuel.

According to still another aspect of the present disclosure, an aircraft system is provided that includes a combustor and a fluid delivery system. The combustor includes a combustion chamber. The fluid delivery system includes a hydrogen fuel source, a water source, a liquid fuel source, a gas manifold, a liquid manifold and a plurality of fuel injectors. The fluid delivery system is configured to direct hydrogen gas from the hydrogen fuel source, through the gas manifold, to the fuel injectors for injection into the combustion chamber during a first mode of operation. The fluid delivery system is configured to direct water from the water source, through the liquid manifold, to the fuel injectors for injection into the combustion chamber during the first mode of operation. The fluid delivery system is configured to direct liquid fuel from the liquid fuel source, through the liquid manifold, to the fuel injectors for injection into the combustion chamber during a second mode of operation.

The water source may be configured as or otherwise include a water recovery system. The water recovery system may be configured to extract water vapor from combustion products generated within the combustion chamber to provide at least some of the water.

The fluid delivery system may be configured to switch between the first mode of operation and the second mode of operation during aircraft flight.

The gaseous fuel may be or otherwise include gaseous hydrogen.

The gaseous fuel may only include the hydrogen gas.

The first liquid fluid may only include the water.

The first liquid fluid may also include the liquid fuel.

The second liquid fluid may only include the liquid fuel.

The second liquid fluid may also include the water.

The gas manifold may not direct the gaseous fuel to the fuel injectors during the second mode of operation.

The method may also include extracting water vapor from combustion products generated by the gas turbine engine to provide at least some of the water.

The method may also include switching between the first mode of operation and the second mode of operation during operation of the gas turbine engine.

The gas turbine engine may be configured onboard an aircraft.

The method may also include switching between the first mode of operation and the second mode of operation during a flight of the aircraft.

The method may also include switching between the first mode of operation and the second mode of operation while the aircraft is on-ground.

The method may also include: directing the water from a water source, through a feed circuit, to the liquid manifold during the first mode of operation; and directing the liquid fuel from a liquid fuel source, through the feed circuit, to the liquid manifold during the second mode of operation.

The method may also include: directing the water from a water source, through a water feed circuit, to the liquid manifold during the first mode of operation; and directing the liquid fuel from a liquid fuel source, through a liquid fuel feed circuit, to the liquid manifold during the second mode of operation. The liquid fuel feed circuit may be fluidly coupled to the liquid manifold independent of the water feed circuit.

The method may also include: injecting the gaseous fuel into a combustion chamber of the gas turbine engine through the fuel injectors during the first mode; and/or injecting the water into the combustion chamber through the fuel injectors during the first mode; and/or injecting the liquid fuel into the combustion chamber through the fuel injectors during the second mode.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
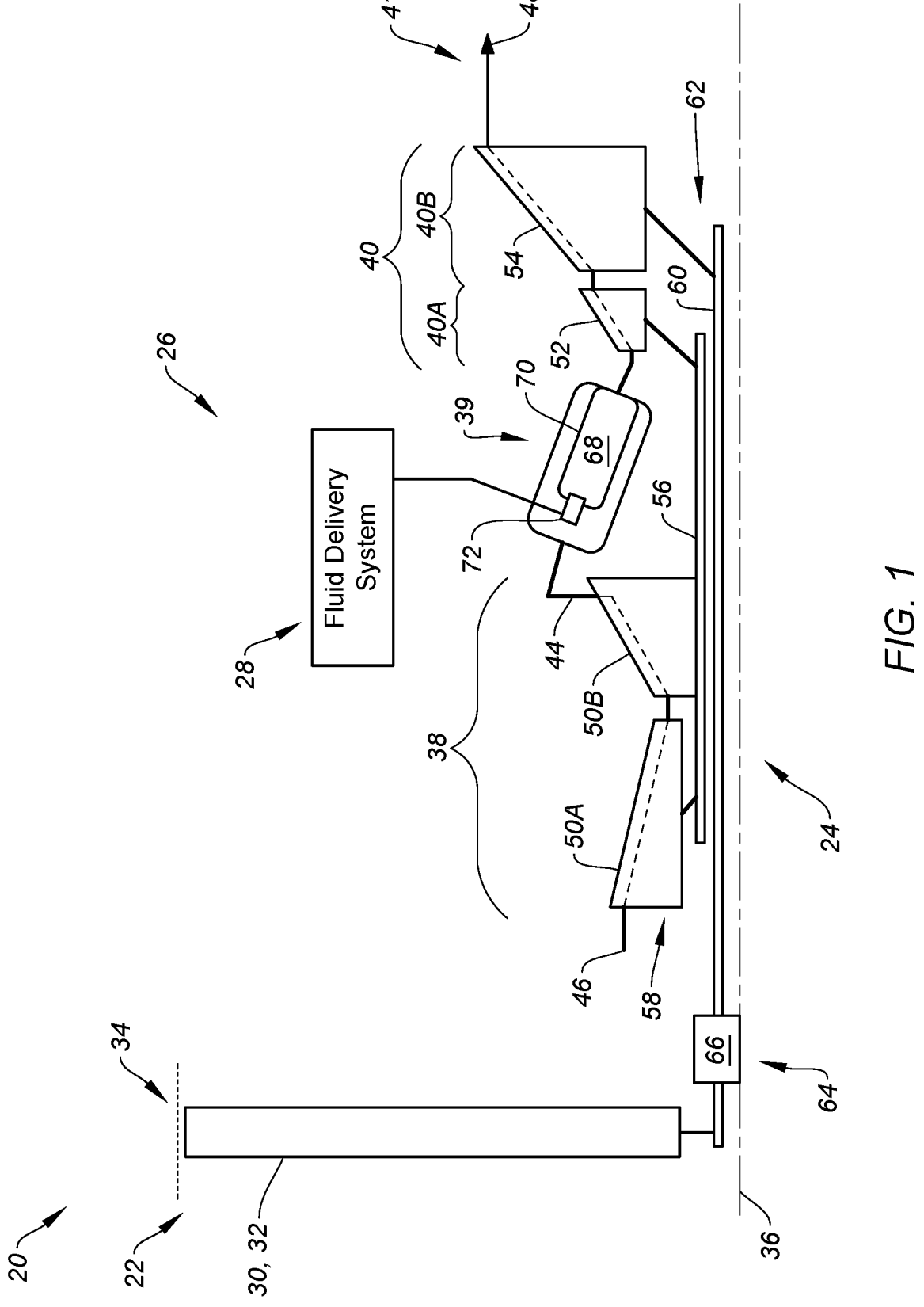
FIG. 1 is a partial schematic illustration of an aircraft system with a gas turbine engine.

FIG. 1 illustrates a system 20 for an aircraft. The aircraft may be an airplane, a helicopter, a drone (e.g., an unmanned aerial vehicle (UAV)) or any other manned or unmanned aerial vehicle or system. The aircraft system 20 may be configured as, or otherwise included as part of, a propulsion system for the aircraft. The aircraft system 20 may also or alternatively be configured as, or otherwise included as part of, an electrical power system for the aircraft. The aircraft system 20 of FIG. 1 includes a mechanical load 22 and a core 24 of a gas turbine engine 26. The aircraft system 20 also include a fluid delivery system 28.

The mechanical load 22 may be configured as or otherwise include a rotor 30 mechanically driven and/or otherwise powered by the engine core 24. This driven rotor 30 may be a bladed propulsor rotor 32 (e.g., an air mover) where the aircraft system 20 is (or is part of) the aircraft propulsion system. The propulsor rotor 32 includes a plurality of rotor blades arranged circumferentially around and connected to at least (or only) one rotor base (e.g., a disk or a hub). The propulsor rotor 32 may be an open (e.g., un-ducted) propulsor rotor or a ducted propulsor rotor. Examples of the open propulsor rotor include a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. An example of the ducted propulsor rotor is a fan rotor for a turbofan propulsion system. The present disclosure, of course, is not limited to the foregoing exemplary propulsor rotor arrangements. Moreover, the driven rotor 30 may alternatively be a generator rotor of an electric power generator where the aircraft system 20 is (or is part of) the aircraft power system; e.g., an auxiliary power unit (APU) for the aircraft. However, for ease of description, the mechanical load 22 may be generally described below as a propulsor section 34 of the gas turbine engine 26 and the driven rotor 30 may be generally described as the propulsor rotor 32 within the propulsor section 34.

The engine core 24 extends axially along an axis 36 between an upstream, forward end of the engine core 24 and a downstream, aft end of the engine core 24. This axis 36 may be a centerline axis of the gas turbine engine 26 and/or its engine core 24. The axis 36 may also or alternatively be a rotational axis of one or more rotating assemblies (e.g., 58 and 62) of the gas turbine engine 26 and its engine core 24. The engine core 24 includes a core compressor section 38, a core combustor section 39, a core turbine section 40, a core exhaust section 41 and a core flowpath 44. The turbine section 40 of FIG. 1 includes a high pressure turbine (HPT) section 40A and a low pressure turbine (LPT) section 40B; e.g., a power turbine (PT) section. The core flowpath 44 extends sequentially through the compressor section 38, the combustor section 39, the HPT section 40A, the LPT section 40B and the exhaust section 41 from an airflow inlet 46 into the core flowpath 44 to a combustion products exhaust 48 from the core flowpath 44. The core inlet 46 may be disposed at (e.g., on, adjacent or proximate) the forward end of the engine core 24, and the core exhaust 48 may be disposed at the aft end of the engine core 24.

The compressor section 38 includes one or more bladed compressor rotors 50A and 50B (generally referred to as "50"). The first stage compressor rotor 50A of FIG. 1 is configured as an axial flow compressor rotor; e.g., an axial inflow-axial outflow compressor rotor. The second stage compressor rotor 50B of FIG. 1 is configured as a radial flow compressor rotor; e.g., an axial inflow-radial outflow compressor rotor. Each of these compressor rotors 50 includes a plurality of compressor blades (e.g., compressor airfoils, compressor vanes, etc.) arranged circumferentially around and connected to at least (or only) one rotor base (e.g., a disk, a hub, etc.). The compressor rotors 50 are disposed in and arranged longitudinally along the core flowpath 44 between the core inlet 46 and the combustor section 39. The compressor blades, for example, are disposed in and extend across the core flowpath 44. Each rotor base is disposed adjacent (e.g., radially below) the core flowpath 44. The present disclosure, however, is not limited to the foregoing exemplary compressor section arrangement. For example, while the compressor section 38 is schematically shown in FIG. 1 with two stages, the compressor section 38 may alternatively include a single one of the stages or more than two stages. Moreover, while the compressor rotors 50 are respectively shown as axial and radial flow compressor rotors, any one or more of the compressor rotors 50 may alternatively be configured as an axial flow compressor rotor or a radial flow compressor rotor.

The HPT section 40A includes a blade high pressure turbine (HPT) rotor 52. The HPT rotor 52 of FIG. 1 is configured as an axial flow turbine rotor; e.g., an axial inflow-axial outflow turbine rotor. The HPT rotor 52 includes a plurality of turbine blades (e.g., turbine airfoils, turbine vanes, etc.) arranged circumferentially around and connected to at least (or only) one rotor base (e.g., a disk, a hub, etc.). The HPT rotor 52 is disposed in and arranged longitudinally along the core flowpath 44 between the combustor section 39 and the LPT section 40B. The turbine blades, for example, are disposed in and extend across the core flowpath 44. The rotor base is disposed adjacent (e.g., radially below) the core flowpath 44. The present disclosure, however, is not limited to the foregoing exemplary HPT section arrangement. For example, while the HPT section 40A is schematically shown in FIG. 1 with a single stage, the HPT section 40A may alternatively include multiple stages. Moreover, while the HPT rotor 52 is shown as an axial flow turbine rotor, the HPT rotor 52 may alternatively be configured as a radial flow turbine rotor.

The LPT section 40B includes a blade low pressure turbine (LPT) rotor 54. The LPT rotor 54 of FIG. 1 is configured as an axial flow turbine rotor; e.g., an axial inflow-axial outflow turbine rotor. The LPT rotor 54 includes a plurality of turbine blades (e.g., turbine airfoils, turbine vanes, etc.) arranged circumferentially around and connected to at least (or only) one rotor base (e.g., a disk, a hub, etc.). The LPT rotor 54 is disposed in and arranged longitudinally along the core flowpath 44 between the HPT section 40A and the exhaust section 41 and its core exhaust 48. The turbine blades, for example, are disposed in and extend across the core flowpath 44. The rotor base is disposed adjacent (e.g., radially below) the core flowpath 44. The present disclosure, however, is not limited to the foregoing exemplary LPT section arrangement. For example, while the LPT section 40B is schematically shown in FIG. 1 with a single stage, the LPT section 40B may alternatively include multiple stages. Moreover, while the LPT rotor 54 is shown as an axial flow turbine rotor, the LPT rotor 54 may alternatively be configured as a radial flow turbine rotor.

The compressor rotors 50 are coupled to and rotatable with the HPT rotor 52. The compressor rotors 50 of FIG. 1, for example, are connected to the HPT rotor 52 by a high speed shaft 56. At least (or only) the compressor rotors 50, the HPT rotor 52 and the high speed shaft 56 collectively form the high speed rotating assembly 58; e.g., a high speed spool. The LPT rotor 54 is connected to a low speed shaft 60. At least (or only) the LPT rotor 54 and the low speed shaft 60 collectively form the low speed rotating assembly 62. This low speed rotating assembly 62 is further coupled to the driven rotor 30 (e.g., the propulsor rotor 32) through a drivetrain 64. The drivetrain 64 may be configured as a geared drivetrain, where a geartrain 66 (e.g., a transmission, a speed change device, an epicyclic geartrain, etc.) is disposed between and operatively couples the driven rotor 30 to the low speed rotating assembly 62 and its LPT rotor 54. With this arrangement, the driven rotor 30 may rotate at a different (e.g., slower) rotational velocity than the low speed rotating assembly 62 and its LPT rotor 54. However, the drivetrain 64 may alternatively be configured as a direct drive drivetrain, where the geartrain 66 is omitted. With this arrangement, the driven rotor 30 rotates at a common (the same) rotational velocity as the low speed rotating assembly 62 and its LPT rotor 54. Referring again to FIG. 1, each of the rotating assemblies 58 and 62 and its members may be rotatable about the axis 36.

During operation of the gas turbine engine 26, air may be directed across the driven rotor 30 (e.g., the propulsor rotor 32) and into the engine core 24 through the core inlet 46. This air entering the core flowpath 44 may be referred to as core air. The core air is compressed by the compressor rotors 50 and directed into a combustion chamber 68 (e.g., an annular combustion chamber) within a combustor 70 (e.g., an annular combustor) of the combustor section 39. Fuel is injected into the combustion chamber 68 by one or more fuel injectors 72 and mixed with the compressed core air to provide a fuel-air mixture. This fuel-air mixture is ignited and combustion products thereof flow through and sequentially cause the HPT rotor 52 and the LPT rotor 54 to rotate. The rotation of the HPT rotor 52 drives rotation of the compressor rotors 50 and, thus, the compression of the air received from the core inlet 46. The rotation of the LPT rotor 54 drives rotation of the driven rotor 30. Where the driven rotor 30 is configured as the propulsor rotor 32, the rotation of that propulsor rotor 32 may propel additional air (e.g., outside air, bypass air, etc.) outside of the engine core 24 to provide aircraft thrust and/or lift. Where the driven rotor 30 is configured as the generator rotor, the rotation of that generator rotor may facilitate generation of electricity.

Figure 2:
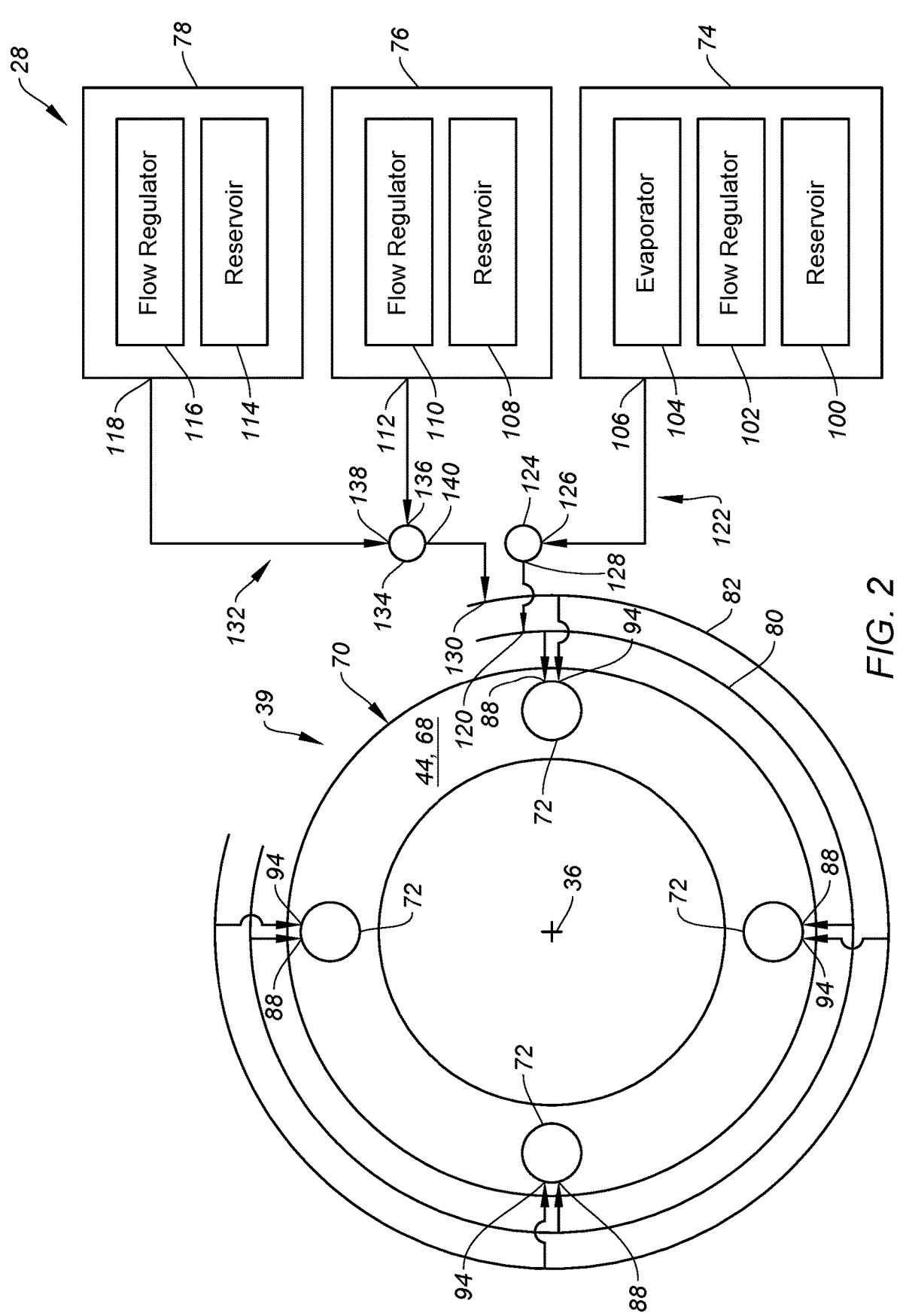
FIG. 2 is a partial schematic illustration of a fluid delivery system arranged with a combustor section of the gas turbine engine.

Referring to FIG. 2, the fluid delivery system 28 is configured to deliver the fuel to the combustor 70 for combustion as described above. This fuel may be a gaseous fuel, a liquid fuel or a combination of the gaseous fuel and the liquid fuel. The fluid delivery system 28 is also configured to deliver water (e.g., liquid water) to the combustor 70. The fluid delivery system 28 of FIG. 2, for example, includes the one or more fuel injectors 72. This fluid delivery system 28 also includes a gaseous fuel source 74, a liquid fuel source 76, a liquid water source 78, a gas manifold 80 and a liquid manifold 82.

Figure 3:
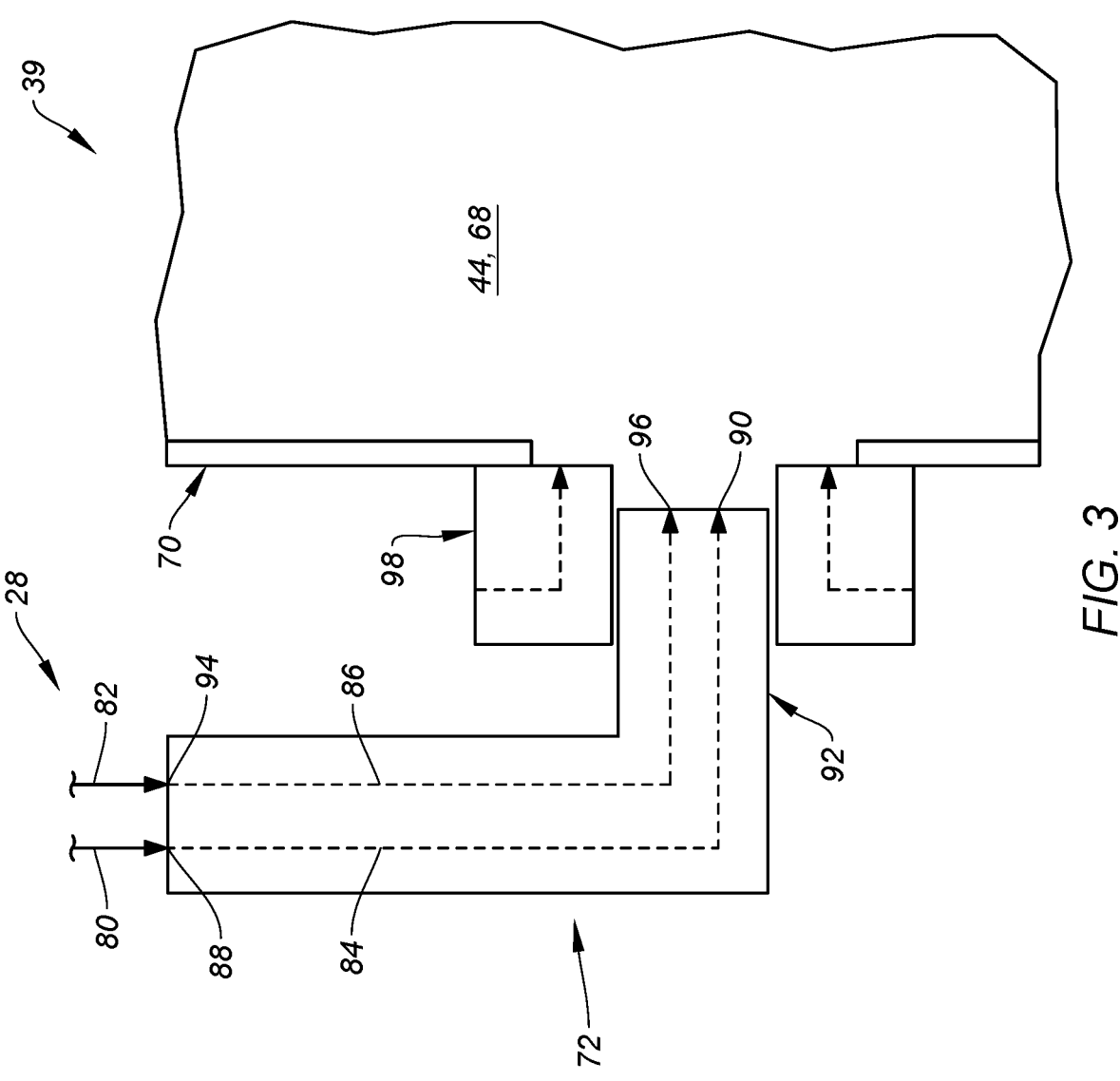
FIG. 3 is a partial schematic illustration of a fuel injector for the fluid delivery system arranged with a combustor.

The fuel injectors 72 of FIG. 2 are arranged circumferentially about the axis 36 in an array; e.g., a circular array. Referring to FIG. 3, each fuel injector 72 is configured to direct the fuel into the combustion chamber 68. Each fuel injector 72, for example, includes an internal gas circuit 84 and an internal liquid circuit 86. The gas circuit 84 extends in the respective fuel injector 72 from an inlet 88 into the gas circuit 84 to at least (or only) one outlet 90 from the gas circuit 84. The gas circuit outlet 90 ("gas outlet") is configured to direct a flow (e.g., a stream, a jet, a spray, a mist, etc.) of the gaseous fuel out of a nozzle 92 of the respective fuel injector 72 into the combustion chamber 68. Similarly, the liquid circuit 86 extends in the respective fuel injector 72 from an inlet 94 into the liquid circuit 86 to at least (or only) one outlet 96 from the liquid circuit 86. The liquid circuit outlet 96 ("liquid outlet) is configured to direct a flow (e.g., a stream, a jet, a spray, a mist, etc.) of the liquid fuel out of the injector nozzle 92 into the combustion chamber 68. This liquid circuit 86 is configured to also or alternatively direct a flow (e.g., a stream, a jet, a spray, a mist, etc.) of the water out of the injector nozzle 92 into the combustion chamber 68.

The injector nozzle 92 of FIG. 3 may (or may not) be arranged with an air swirler 98. The air swirler 98 of FIG. 3 is configured to direct swirled compressed core air into the combustion chamber 68 along with the fuel and/or the water. The swirled compressed core air mixes with the fuel and/or water injected by the respective injector nozzle 92, and may facilitate enhanced and/or a more efficient combustion process.

The gaseous fuel source 74 of FIG. 2 includes a gaseous fuel source (GFS) fuel reservoir 100, a gaseous fuel source (GFS) fuel flow regulator 102 and a gaseous fuel source (GFS) fuel evaporator 104. The GFS fuel reservoir 100 is configured to store a quantity of fuel (e.g., in its liquid phase) before, during and/or after aircraft system operation. The GFS fuel reservoir 100, for example, may be configured as or otherwise include a tank, a cylinder, a pressure vessel, a bladder or any other type of (e.g., insulated) fuel storage container. The GFS fuel flow regulator 102 is configured to direct a flow of the fuel (e.g., in its liquid phase) from the GFS fuel reservoir 100 to the GFS fuel evaporator 104. The GFS fuel flow regulator 102, for example, may be configured as or otherwise include a fuel compressor, a fuel pump and/or a fuel valve (or valves). The GFS fuel evaporator 104 is configured to facilitate evaporation of the fuel from its liquid phase to a gaseous phase so as to output the gaseous fuel from an outlet 106 of the gaseous fuel source 74.

The gaseous fuel may be a non-hydrocarbon gas. The gaseous fuel, for example, may be or otherwise include hydrogen gas ($H_2$ gas), and the fuel stored within the GFS fuel reservoir 100 may be liquid hydrogen (liquid $H_2$). The gaseous fuel, however, is not limited to non-hydrocarbon gases. The gaseous fuel, for example, may alternatively by or otherwise include gaseous methane (e.g., natural gas) or propane. However, use of the non-hydrocarbon gas such as the hydrogen gas may be particularly beneficial for reduction in emissions from the gas turbine engine 26 (see FIG. 1). The gaseous fuel may therefore be generally described below as the hydrogen gas for ease of description.

The liquid fuel source 76 of FIG. 2 includes a liquid fuel source (LFS) fuel reservoir 108 and a liquid fuel source (LFS) fuel flow regulator 110. The LFS fuel reservoir 108 is configured to store a quantity of the liquid fuel before, during and/or after aircraft system operation. The LFS fuel reservoir 108, for example, may be configured as or otherwise include a tank, a cylinder, a pressure vessel, a bladder or any other type of fuel storage container. The LFS fuel flow regulator 110 is configured to direct a flow of the liquid fuel from the LFS fuel reservoir 108 to an outlet 112 of the liquid fuel source 76 to output the liquid fuel.

The liquid fuel may be a hydrocarbon liquid. The liquid fuel, for example, may be or otherwise include kerosene, jet fuel (e.g., jet A fuel), sustainable aviation fuel (SAF) or any other power-to-liquid (PTL) fuel, or the like. The present disclosure, however, is not limited to the foregoing exemplary liquid fuels, nor to hydrocarbon liquids.

The water source 78 of FIG. 2 includes a water reservoir 114 and a water flow regulator 116. The water reservoir 114 is configured to store a quantity of the water before, during and/or after aircraft system operation. The water reservoir 114, for example, may be configured as or otherwise include a tank, a cylinder, a pressure vessel, a bladder or any other type of water storage container. The water flow regulator 116 is configured to direct a flow of the water from the water reservoir 114 to an outlet 118 of the water source 78 to output the water.

The gas manifold 80 is configured to deliver and distribute the gaseous fuel received from the gaseous fuel source 74 to one or more or all of the fuel injectors 72. The gas manifold 80 of FIG. 2, for example, is fluidly coupled with and between the outlet 106 from the gaseous fuel source 74 and the inlet 88 to each of the gas circuits 84 of FIG. 3. The gas manifold 80 of FIG. 2 extends circumferentially about (e.g., partially around) the combustor 70 and the axis 36 between an upstream end of the gas manifold 80 and a downstream end of the gas manifold 80. The gas circuit inlets 88 are fluidly coupled to the gas manifold 80 directly or indirectly (e.g., through a conduit) at discrete circumferential locations serially along a longitudinal length of the gas manifold 80 between the gas manifold ends. The gaseous fuel source 74 and its outlet 106 of FIG. 2 are fluidly coupled to an inlet 120 into the gas manifold 80 through a gaseous fuel feed circuit 122.

The gaseous fuel feed circuit 122 of FIG. 2 includes a gaseous fuel valve 124 (e.g., a two-way control valve) between the gaseous fuel source 74 and the gas manifold 80. A fuel inlet 126 into the gaseous fuel valve 124 is fluidly coupled with and downstream of the gaseous fuel source 74 and its outlet 106. A fuel outlet 128 from the gaseous fuel valve 124 is fluidly coupled with and upstream of the inlet 120 into the gas manifold 80. The gaseous fuel valve 124 may thereby (e.g., completely and/or partially) open to fluidly couple the gaseous fuel source 74 to the gas manifold 80 and, thus, the fuel injectors 72 and their gas circuits 84 (see FIG. 3). The gaseous fuel valve 124 may (e.g., completely) close to fluidly decouple the gaseous fuel source 74 from the gas manifold 80 and, thus, the fuel injectors 72 and their gas circuits 84 (see FIG. 3).

The liquid manifold 82 is configured to deliver and distribute the liquid fuel received from the liquid fuel source 76 and the water from the water source 78 to one or more or all of the fuel injectors 72. The liquid manifold 82 of FIG. 2, for example, is fluidly coupled with and between (a) the outlet 112 from the liquid fuel source 76 and the outlet 118 from the water source 78 and (b) the inlet 94 to each of the liquid circuits 86 of FIG. 3. The liquid manifold 82 of FIG. 2 extends circumferentially about (e.g., partially around) the combustor 70 and the axis 36 between an upstream end of the liquid manifold 82 and a downstream end of the liquid manifold 82. The liquid circuit inlets 94 are fluidly coupled to the liquid manifold 82 directly or indirectly (e.g., through a conduit) at discrete circumferential locations serially along a longitudinal length of the liquid manifold 82 between the liquid manifold ends. The liquid fuel source 76 and its outlet 112 of FIG. 2 are fluidly coupled to an inlet 130 into the liquid manifold 82 through a fluid feed circuit 132. The water source 78 and its outlet 118 of FIG. 2 are also fluidly coupled to the liquid manifold inlet 130 through the fluid feed circuit 132; e.g., in parallel with the liquid fuel source 76 and its outlet 112.

The fluid feed circuit 132 of FIG. 2 includes a fluid valve 134 (e.g., a three-way control valve) between the liquid fuel source 76, the water source 78 and the liquid manifold 82. A fuel inlet 136 into the fluid valve 134 is fluidly coupled with and downstream of the liquid fuel source 76 and its outlet 112. A water inlet 138 into the fluid valve 134 is fluidly coupled with and downstream of the water source 78 and its outlet 118. A fluid outlet 140 from the fluid valve 134 is fluidly coupled with and upstream of the inlet 130 into the liquid manifold 82. The fluid valve 134 may thereby (e.g., completely and/or partially) open a fuel side to fluidly couple the liquid fuel source 76 to the liquid manifold 82 and, thus, the fuel injectors 72 and their liquid circuits 86 (see FIG. 3). The fluid valve 134 may (e.g., completely) close the fuel side to fluidly decouple the liquid fuel source 76 from the liquid manifold 82 and, thus, the fuel injectors 72 and their liquid circuits 86 (see FIG. 3). In addition or alternatively, the fluid valve 134 may (e.g., completely and/or partially) open a water side to fluidly couple the water source 78 to the liquid manifold 82 and, thus, the fuel injectors 72 and their liquid circuits 86 (see FIG. 3). The fluid valve 134 may (e.g., completely) close the water side to fluidly decouple the water source 78 from the liquid manifold 82 and, thus, the fuel injectors 72 and their liquid circuits 86 (see FIG. 3).

Figure 4:
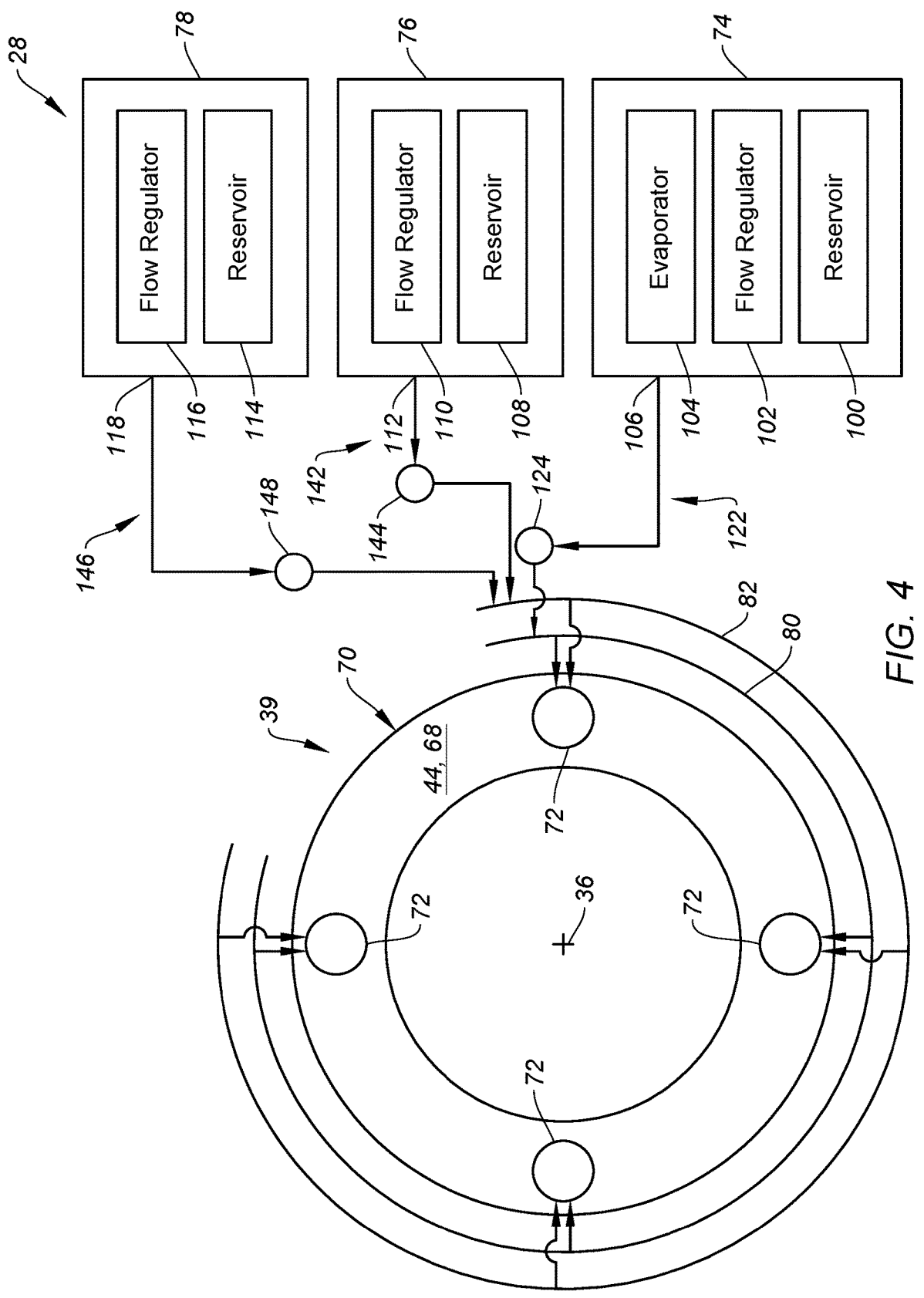
FIG. 4 is a partial schematic illustration of another fluid delivery system arranged with the combustor section.

In the arrangement of FIG. 2, the liquid fuel source 76 and the water source 78 are fluidly coupled in parallel with the liquid manifold 82 through the common (the same) fluid feed circuit 132. In other arrangements however, referring to FIG. 4, the liquid fuel source 76 and the water source 78 may alternatively be fluidly coupled to the liquid manifold 82 independent of one another. The liquid fuel source 76 of FIG. 4, for example, is fluidly coupled to the liquid manifold 82 by a liquid fuel feed circuit 142 with a (e.g., dedicated) liquid fuel valve 144; e.g., a two-way control valve. The water source 78 of FIG. 4 is similarly fluidly coupled to the liquid manifold 82 by a water feed circuit 146 with a (e.g., dedicated) water valve 148; e.g., a two-way control valve. Here, the water feed circuit 146 fluidly couples the water source 78 to the liquid manifold 82 independent of the liquid fuel feed circuit 142, and the liquid fuel feed circuit 142 fluidly couples the liquid fuel source 76 to the liquid manifold 82 independent of the water feed circuit 146.

Referring again to FIG. 2, the fluid delivery system 28 is configured to operate in various different modes of operation during operation of the aircraft system 20 and its gas turbine engine 26 of FIG. 1. The fluid delivery system 28 of FIG. 2, for example, may operate in a gaseous fuel mode, a liquid fuel mode and/or a multi-fuel mode.

During the gaseous fuel mode, the gaseous fuel valve 124 partially or completely opens to fluidly couple the gaseous fuel source 74 to the gas manifold 80. The fluid delivery system 28 may thereby direct the gaseous fuel (e.g., the hydrogen gas) from the gaseous fuel source 74, through the gas manifold 80, to the fuel injectors 72 and their gas circuits 84 (see FIG. 3) for injection into the combustion chamber 68. During this gaseous fuel mode, the fluid valve 134 (or the liquid fuel valve 144 of FIG. 4) may close to fluidly decouple the liquid fuel source 76 from the liquid manifold 82. Thus, the liquid manifold 82 may not receive nor flow (e.g., any) of the liquid fuel during the gaseous fuel mode. However, the fluid valve 134 (or the water valve 148 of FIG. 4) may partially or completely open to fluidly couple the water source 78 to the liquid manifold 82. The fluid delivery system 28 may thereby also direct the water from the water source 78, through the liquid manifold 82, to the fuel injectors 72 and their liquid circuits 86 (see FIG. 3) for injection into the combustion chamber 68. The fluid delivery system 28 may therefore inject the gaseous fuel and the water concurrently into the combustion chamber 68. Injecting the water into the combustion chamber 68 with the gaseous fuel may have various benefits including, but not limited to, improving combustion dynamics within the combustion chamber 68, reducing NOx production in the combustion products, lowering nozzle tip temperature and improving durability, etc. However, under certain operational and/or flight conditions, it is contemplated the fluid valve 134 (or the water valve 148 of FIG. 4) may alternatively close to fluidly decouple the water source 78 from the liquid manifold 82. Thus, the liquid manifold 82 may not receive nor flow (e.g., any) of the water.

During the liquid fuel mode, the fluid valve 134 (or the liquid fuel valve 144 of FIG. 4) partially or completely opens to fluidly couple the liquid fuel source 76 to the liquid manifold 82. The fluid delivery system 28 may thereby direct the liquid fuel from the liquid fuel source 76, through the liquid manifold 82, to the fuel injectors 72 and their liquid circuits 86 (see FIG. 3) for injection into the combustion chamber 68. During this liquid fuel mode, the gaseous fuel valve 124 may close to fluidly decouple the gaseous fuel source 74 from the gas manifold 80. Thus, the gas manifold 80 may not receive nor flow (e.g., any) of the gaseous fuel during the liquid fuel mode. Similarly, the fluid valve 134 (or the water valve 148 of FIG. 4) may close to fluidly decouple the water source 78 from the liquid manifold 82. Thus, the liquid manifold 82 may not receive nor flow (e.g., any) of the water. However, under certain operational and/or flight conditions, it is contemplated the fluid valve 134 (or the water valve 148 of FIG. 4) may alternatively partially or completely open to fluidly couple the water source 78 to the liquid manifold 82. The fluid delivery system 28 may thereby also direct the water from the water source 78, through the liquid manifold 82, to the fuel injectors 72 and their liquid circuits 86 (see FIG. 3) for injection into the combustion chamber 68. Here, the water mixes with the liquid fuel within the fluid feed circuit 132 (e.g., downstream of the fluid valve 134), or within an upstream portion of the liquid manifold 82 of FIG. 4. The liquid fuel and the water may therefore be directed through the liquid manifold 82 together as a fuel-water mixture to the fuel injectors 72 and their liquid circuits 86 for injection into the combustion chamber 68.

During the multi-fuel mode, the gaseous fuel valve 124 partially or completely opens to fluidly couple the gaseous fuel source 74 to the gas manifold 80. The fluid delivery system 28 may thereby direct the gaseous fuel (e.g., the hydrogen gas) from the gaseous fuel source 74, through the gas manifold 80, to the fuel injectors 72 and their gas circuits 84 (see FIG. 3) for injection into the combustion chamber 68. In addition, the fluid valve 134 (or the liquid fuel valve 144 of FIG. 4) partially or completely opens to fluidly couple the liquid fuel source 76 to the liquid manifold 82. The fluid delivery system 28 may thereby also direct the liquid fuel from the liquid fuel source 76, through the liquid manifold 82, to the fuel injectors 72 and their liquid circuits 86 (see FIG. 3) for injection into the combustion chamber 68. This multi-fuel mode may be implemented when switching over between the gaseous fuel mode and the liquid fuel mode. For example, when switching from the liquid fuel mode to the gaseous fuel mode, the delivery of the liquid fuel to the combustor 70 may be decreased (e.g., tapered off)

as the delivery of the gaseous fuel to the combustor 70 may be increased (e.g., ramped up). In another example, when switching from the gaseous fuel mode to the liquid fuel mode, the delivery of the gaseous fuel to the combustor 70 may be decreased (e.g., tapered off) as the delivery of the liquid fuel to the combustor 70 may be increased (e.g., ramped up). The multi-fuel mode may thereby facilitate a smooth transition when switching between gaseous and liquid fuels. Of course, it is contemplated the multi-fuel mode may alternatively be implemented for an extended period of time under certain operational and/or flight conditions.

Also during the multi-fuel mode, the fluid valve 134 (or the water valve 148 of FIG. 4) may partially or completely open to fluidly couple the water source 78 to the liquid manifold 82. The fluid delivery system 28 may thereby also direct the water from the water source 78, through the liquid manifold 82 (e.g., with the liquid fuel), to the fuel injectors 72 and their liquid circuits 86 (see FIG. 3) for injection into the combustion chamber 68. The fluid delivery system 28 may therefore inject the gaseous fuel, the liquid fuel and the water concurrently into the combustion chamber 68. However, under certain operational and/or flight conditions, it is contemplated the fluid valve 134 (or the water valve 148 of FIG. 4) may alternatively close to fluidly decouple the water source 78 from the liquid manifold 82. Thus, the liquid manifold 82 may not receive nor flow (e.g., any) of the water.

As described above, referring to FIG. 1, the multi-fuel mode may facilitate a smooth transition when switching between gaseous and liquid fuels. This switching between the modes may occur during (e.g., continuous and/or uninterrupted) operation of the aircraft system 20 and its gas turbine engine 26 while the aircraft is inflight or on-ground. Alternatively, the switching between the modes may occur while the aircraft system 20 and its gas turbine engine 26 are non-operational. For example, the fluid delivery system 28 may be (e.g., manually) switched between the gaseous fuel mode and the liquid fuel mode. Here, the switching may occur without operating the aircraft system 20 and its gas turbine engine 26 in the multi-fuel mode. Of course, it is also contemplated the switching between the modes may occur during (e.g., discontinuous and/or interrupted) operation of the aircraft system 20 and its gas turbine engine 26 without operating the aircraft system 20 and its gas turbine engine 26 in the multi-fuel mode. For example, momentarily during the switch between the gaseous fuel mode and the liquid fuel mode, no fuel (e.g., none of the gaseous fuel nor the liquid fuel) may be delivered to the combustor 70.

Figure 5:
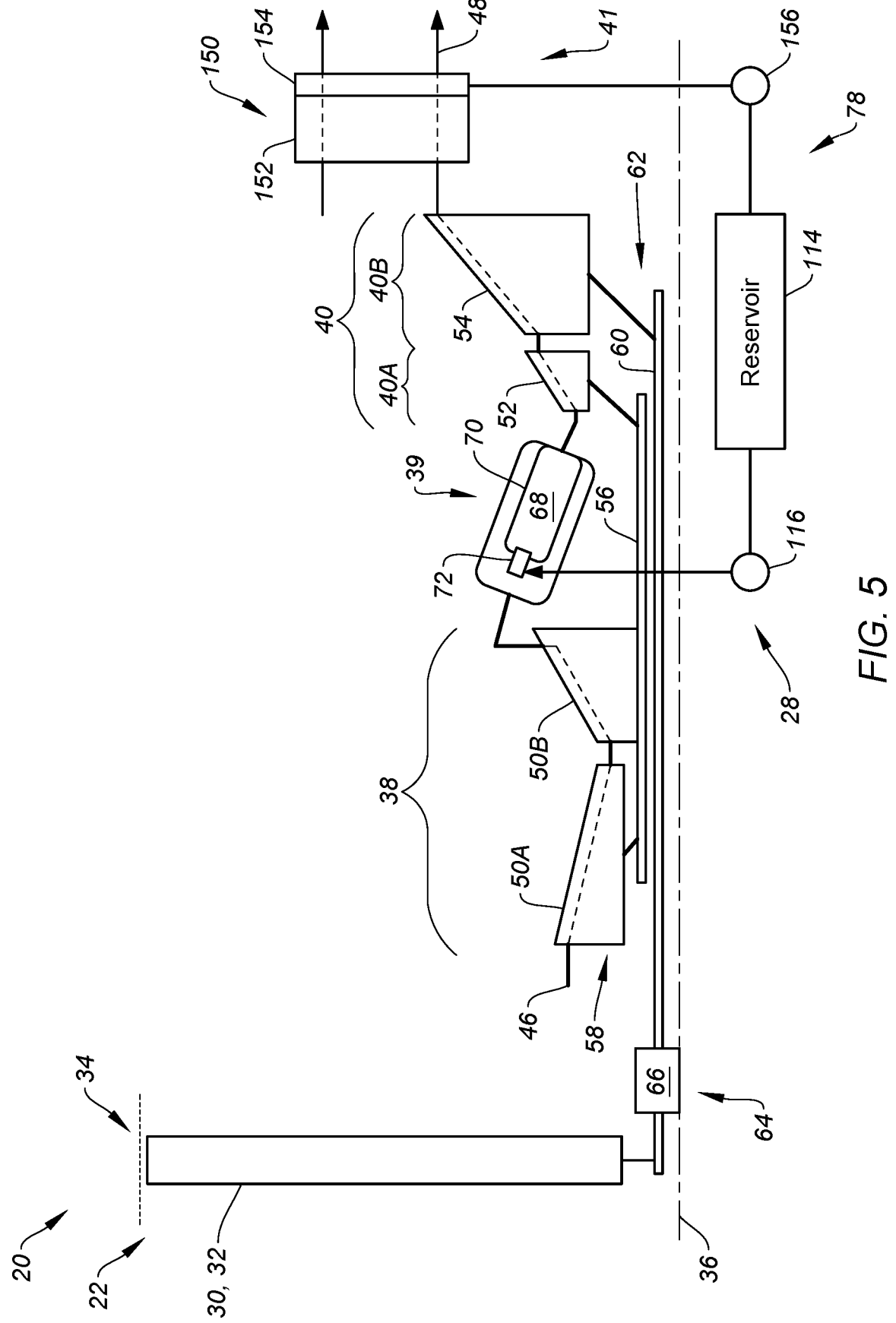
FIG. 5 is a partial schematic illustration of the aircraft system with a water recovery system.

In some embodiments, referring to FIG. 5, the water source 78 may include a water recovery system 150 in addition to (or instead of) the water reservoir 114. The water recovery system 150 of FIG. 5 includes a water condenser 152 and a water separator 154. The water recovery system 150 may also include a water flow regulator 156; e.g., a compressor, a pump and/or a valve. The water condenser 152 may be arranged downstream of one or more of the engine sections 39, 40A, 40B. The water condenser 152 of FIG. 5, for example, is arranged along the core flowpath 44 within the exhaust section 41, between the HPT section 40A and the core exhaust 48. The water condenser 152 is configured to exchange heat energy between the combustion products flowing in the core flowpath 44 and a cooling fluid; e.g., ambient air, bypass air, lubricant, fuel, coolant, etc. The water condenser 152 may thereby cool the combustion products and facilitate condensation of water vapor in the combustion products into droplets of water. At least some of these water droplets may be collected by the water separator 154 and directed through the water flow regulator 156 to the water reservoir 114. The water separator 154 may be a passive water separator. The water separator 154, for example, may be configured as or may otherwise include an impingement and/or condensation surface and a gutter arranged with and/or downstream of the water condenser 152. However, various other types of separators are known in the art, and the present disclosure is not limited to any particular ones thereof. Moreover, the present disclosure is not limited to passive water separator arrangements. The water separator 154, for example, may alternatively be a centrifugal water separator or otherwise. With the foregoing arrangement, the water reservoir 114 may have a relatively small capacity since the water within the water reservoir 114 may be (e.g., continually) replenished during operation of the aircraft system 20 and its gas turbine engine 26.

Figure 6:
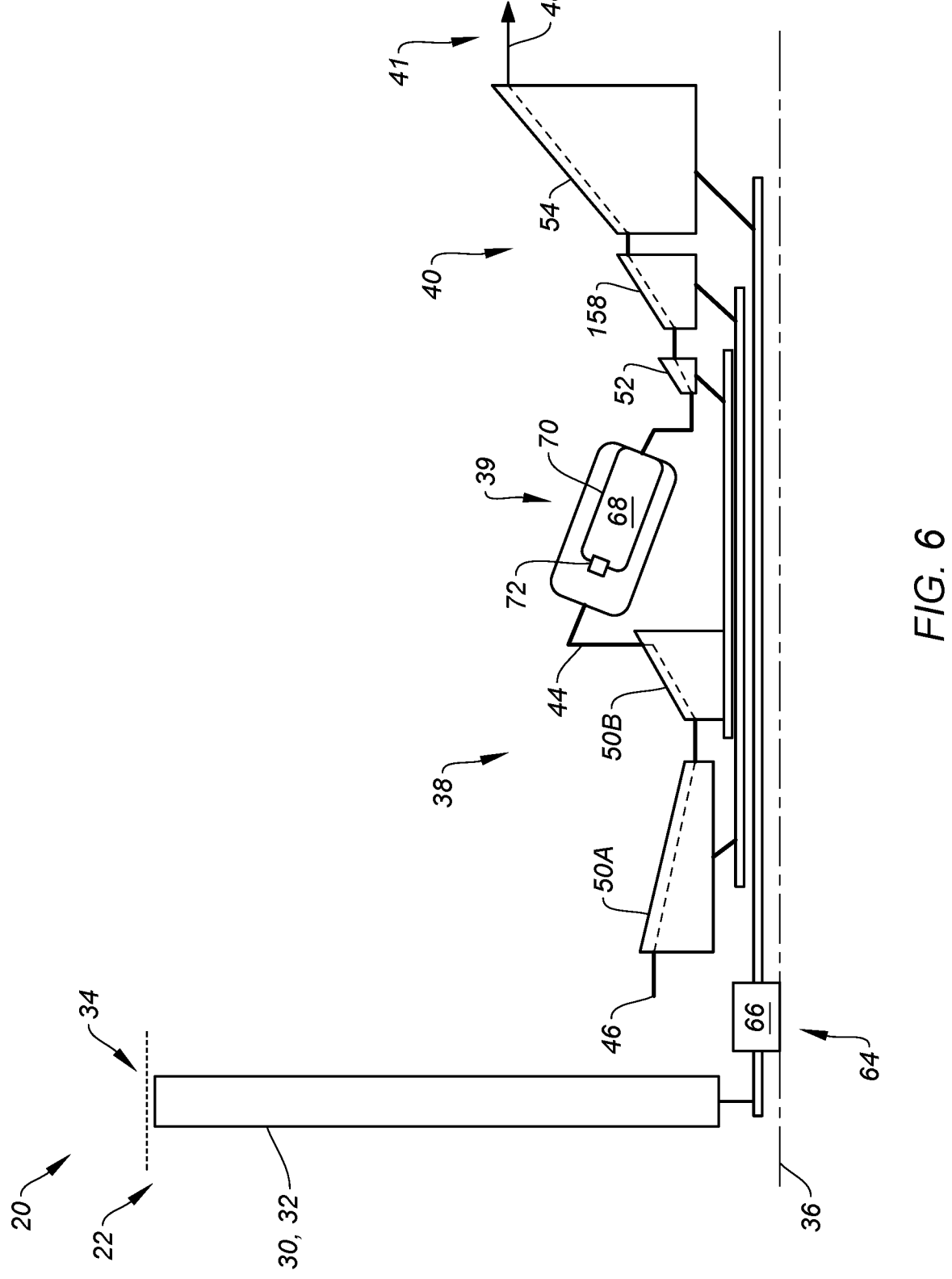
FIG. 6 is a partial schematic illustration of the aircraft system with three rotating assemblies.
Figure 7:
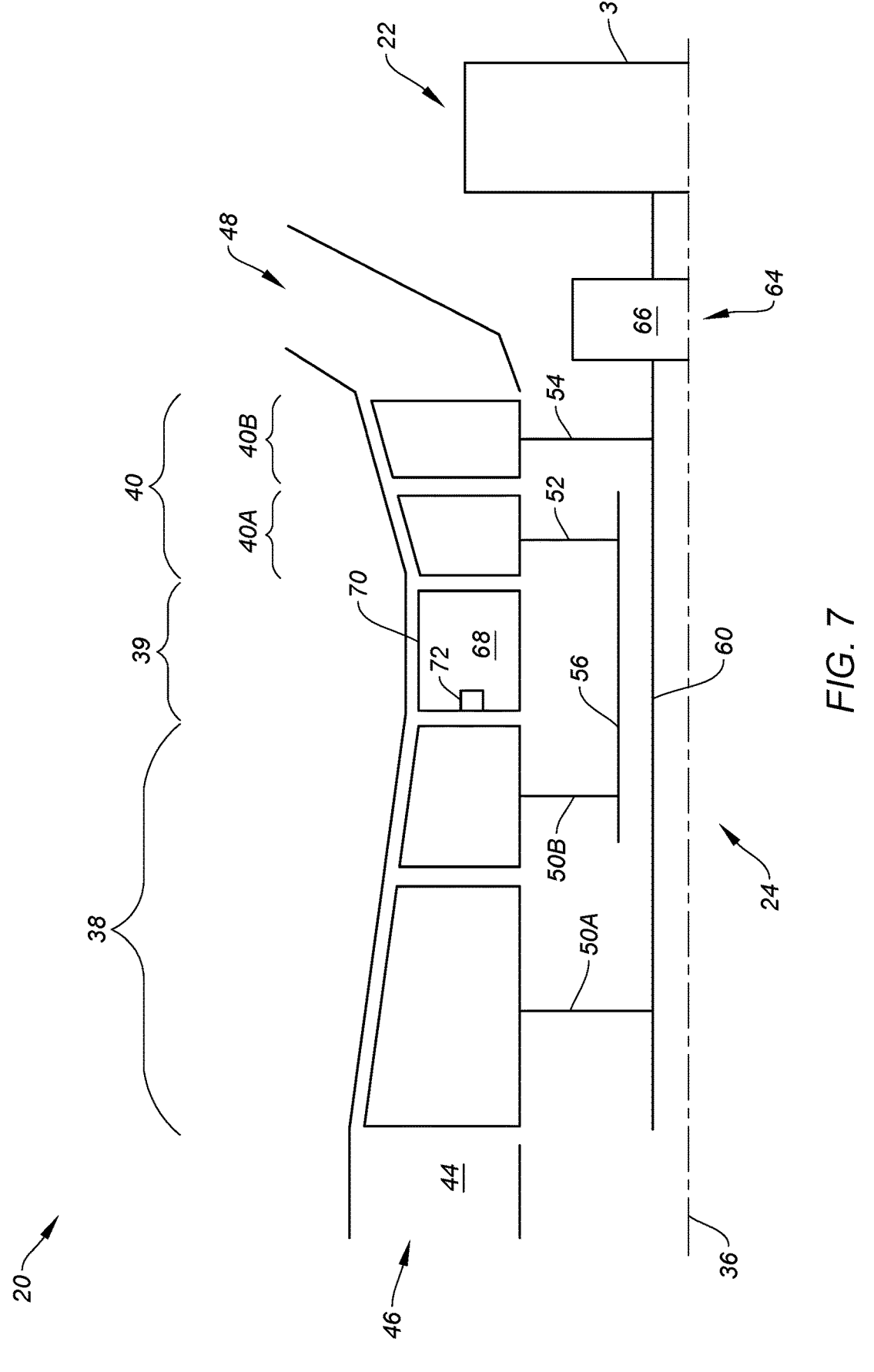
FIG. 7 is a partial schematic illustration of an industrial powerplant.

The engine core 24 is shown in FIG. 1 with two rotating assemblies 58 and 62. It is contemplated, however, the engine core 24 may alternatively be configured with a single rotating assembly, or with three or more rotating assemblies. The engine core 24 of FIG. 6, for example, is configured with an additional turbine rotor 158 (e.g., an intermediate pressure turbine (IPT) rotor) coupled to and configured to drive rotation of the compressor rotor 50B. Moreover, while the system 20 is generally described above with respect to aircraft applications, the present disclosure is not limited thereto. The system 20, for example, may be configured for various non-aircraft applications. The system 20 of FIG. 7, for example, may be configured as or otherwise included as part of a ground-based industrial powerplant. Here, the driven rotor 30 may be configured as the generator rotor for the electric power generator.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:

delivering a gaseous fuel to a plurality of fuel injectors through a gas manifold of a gas turbine engine during a first mode of operation, wherein the gaseous fuel consists of hydrogen gas;

delivering a first liquid fluid to the plurality of fuel injectors through a liquid manifold of the gas turbine engine during the first mode of operation, wherein the gas turbine engine includes the gas manifold, the liquid manifold, and the plurality of fuel injectors, the liquid manifold being different and independent from the gas manifold, the liquid manifold is fluidly discrete of the gas manifold, and wherein the first liquid fluid comprises water; and delivering a second liquid fluid to the plurality of fuel injectors through the liquid manifold during a second mode of operation, wherein the second liquid fluid is different from the first liquid fluid, and wherein the second liquid fluid comprises liquid fuel wherein a first of the plurality of fuel injectors includes a liquid circuit and a gas circuit, the liquid circuit receives the first liquid fluid or the second liquid fluid from the liquid manifold, the gas circuit receives the gaseous fuel from the gas manifold, and the gas circuit is different and independent from the liquid circuit.

2. The method of claim 1, wherein the first liquid fluid consists of the water.

3. The method of claim 1, wherein the first liquid fluid comprises the water mixed with liquid fuel.

4. The method of claim 1, wherein the second liquid fluid consists of the liquid fuel.

5. The method of claim 1, wherein the second liquid fluid comprises the liquid fuel mixed with water.

6. The method of claim 1, wherein the gas manifold does not direct the gaseous fuel to the plurality of fuel injectors during the second mode of operation.

7. The method of claim 1, further comprising extracting water vapor from combustion products generated by the gas turbine engine to provide at least some of the water.

8. The method of claim 1, further comprising switching between the first mode of operation and the second mode of operation during operation of the gas turbine engine.

9. The method of claim 1, wherein the gas turbine engine is configured onboard an aircraft.

10. The method of claim 9, further comprising switching between the first mode of operation and the second mode of operation during a flight of the aircraft.

11. The method of claim 9, further comprising switching between the first mode of operation and the second mode of operation while the aircraft is on-ground.

12. The method of claim 1, further comprising:

directing the water from a water source to the liquid manifold during the first mode of operation; and directing the liquid fuel from a liquid fuel source to the liquid manifold during the second mode of operation.

13. The method of claim 1, further comprising:

directing the water from a water source, through a water feed circuit, to the liquid manifold during the first mode of operation; and directing the liquid fuel from a liquid fuel source to the liquid manifold during the second mode of operation.

14. The method of claim 1, further comprising at least one of:

injecting the gaseous fuel into a combustion chamber of the gas turbine engine through the plurality of fuel injectors during the first mode;

injecting the water into the combustion chamber through the plurality of fuel injectors during the first mode; or injecting the liquid fuel into the combustion chamber through the plurality of fuel injectors during the second mode.

15. An aircraft system, comprising:

a combustor comprising a combustion chamber; and a fluid delivery system including a hydrogen fuel source, a water source, a liquid fuel source, a gas manifold, a liquid manifold and a plurality of fuel injectors, the liquid manifold independent from and fluidly discrete of the gas manifold, the liquid fuel source fluidly couplable to the liquid manifold, the water fuel source fluidly coupled to the liquid manifold and fluidly decoupled from the gas manifold, the hydrogen fuel source fluidly couplable to the gas manifold, a first of the plurality of fuel injectors including a liquid inlet and a gas inlet, the liquid inlet in fluid communication with the liquid manifold, and the gas inlet in fluid communication with the gas manifold;

the fluid delivery system configured to direct and deliver hydrogen gas from the hydrogen fuel source, through the gas manifold, to the plurality of fuel injectors for injection into the combustion chamber during a first mode of operation;

the fluid delivery system configured to direct and deliver water from the water source, through the liquid manifold, to the plurality of fuel injectors for injection into the combustion chamber during the first mode of operation; and the fluid delivery system configured to direct and deliver liquid fuel from the liquid fuel source, through the liquid manifold, to the plurality of fuel injectors for injection into the combustion chamber during a second mode of operation.

16. The aircraft system of claim 15, wherein the water source comprises a water recovery system; and the water recovery system is configured to extract water vapor from combustion products generated within the combustion chamber to provide at least some of the water.

17. The aircraft system of claim 15, wherein the fluid delivery system is configured to switch between the first mode of operation and the second mode of operation during aircraft flight.

* * * * *